United States Patent
Sharma

(10) Patent No.: US 8,961,921 B2
(45) Date of Patent: Feb. 24, 2015

(54) APPARATUS AND METHOD FOR PRODUCING LIQUID FERRATE

(75) Inventor: Virender K. Sharma, Melbourne, FL (US)

(73) Assignee: Florida Institute of Technology, Melbourne, FL (US)

(*) Notice: Subject to any disclaimer, the term of this patent is extended or adjusted under 35 U.S.C. 154(b) by 124 days.

(21) Appl. No.: 12/890,787

(22) Filed: Sep. 27, 2010

(65) Prior Publication Data

US 2011/0076223 A1 Mar. 31, 2011

Related U.S. Application Data

(60) Provisional application No. 61/246,335, filed on Sep. 28, 2009.

(51) Int. Cl.
   C01G 49/00 (2006.01)
   C01D 1/02 (2006.01)
   C01G 49/02 (2006.01)

(52) U.S. Cl.
   CPC ............ *C01G 49/02* (2013.01); *C01G 49/0081* (2013.01); *C01G 49/0018* (2013.01)
   USPC ...................................................... 423/594.2

(58) Field of Classification Search
   CPC ..... B01J 14/00; C01G 49/0018; C01G 49/00; C01G 49/0081; C01G 49/02; C01B 13/14; C01B 13/18; C01B 13/36; C01D 13/00
   USPC ........................... 423/138, 592.1–594.2, 632; 588/313–321, 400; 210/749, 758, 760
   See application file for complete search history.

(56) References Cited

U.S. PATENT DOCUMENTS

| | | | |
|---|---|---|---|
| 4,385,045 A | 5/1983 | Thompson | |
| 4,405,573 A | 9/1983 | Deininger | |
| 4,451,338 A | 5/1984 | Deininger | |
| 4,545,974 A | 10/1985 | Thompson | |
| 4,983,306 A | 1/1991 | Deininger | |
| 5,234,603 A | 8/1993 | Potts | |
| 5,284,642 A | 2/1994 | Evard | |
| 5,380,443 A | 1/1995 | Deininger | |
| 2002/0155044 A1* | 10/2002 | Ciampi et al. | 422/187 |
| 2003/0094420 A1 | 5/2003 | Licht | |
| 2004/0166040 A1 | 8/2004 | Minevski | |

OTHER PUBLICATIONS

Jiang et al, "Progress in the development and use of ferrate (VI) salt as an oxidant and coagulant for water and wastewater treatment", Water Research, vol. 36, 2002, pp. 1397-1408.*
Waite et al, "Oxidation and coagulation of wastewater effluent utilizing ferrate (VI) ion", Chemistry for the protection of the environment, Elsevier 1984, pp. 407-408.*
Seitz et al, "Monitoring Iodinated X-ray Contrast Media in Surface Water," 2006 Chemosphere 64, pp. 1318-1324.*
Potts et al, "Removal of Radionuclides in wastewaters utilizing potassium ferrate (VI)," 1994, Water Environment Research, vol. 66, No. 2 pp. 107-109.*
J.Q. Jiang, B. Lloyd, Water Research 36 (2002) 1397-1408, www.elsevier.com/locate/watres.
Alsheyab, M., et al., On-line production of ferrate with an electrochemical method and its potential . . . , Journal of Environmental Management (2008), doi:10.1016/j.jenvman.2008.10.001.
Stuart Licht, Xingwen Yu, Huiming Wu, The Super-Iron Boride Battery, Journal of The Electrochemical Society, 155(4) A297-A303 (2008).
Lionel Delaude, Pierre Laszlo, A Novel Oxidizing Reagent Based on Potassium Ferrate(VI), Journal Org. Chem., 1996, 61, 6360-6370.
Yunho Lee, Min Cho, Jee Yeon Kim, Jeyong Yoon, Chemistry of Ferrate (FE(VI)) in Aqueous Solution and its Applications as a Green Chemical, J. Ind. Eng. Chem., vol. 10, No. 1, (2004) 161-171.
Sergay K. Dedushenko, Yurii D. Perfiliev, Aleksandr A. Saprykin, Mossbauer Study of Iron in High Oxidation States in the K-Fe-O system, Hyperfine Interact (2008) 185:197-202.
J.Q. Jiang et al., The Application of Potassium Ferrate for Sewage Treatment, Journal of Environmental Management 79 (2006) 215-220.
J. Berry, B. Eckhard, B. Eberhard, S. George, B. Mienert, F. Neese, K. Wieghardt., An Octahedral Coordination Complex of Iron(VI), Science, vol. 312, Jun. 30, 2006.
The Mossbauer Spectra of Solutions of Compounds of Iron in Higher Oxidation States, Russin Journal of Inorganic Chemistry, 35 (7) 1990.
W. Seitz, W. Weber, J. Jiang, B. Lloyd, M. Maier, D. Maier, W. Schultz., Monitoring of Iodinated X-ray Contrast Media in Surface Water., Chemosphere 64 (2006) 1318-1324.
S. K. Dedushenko, Yu Perfiliev, A.M. Golubev, P. Melnikov, P.P. Corbi, A. A. Saprykin, Hyperfine Interactions (C), Oxford UK, vol. 5, Sep. 2-7, 2001.
Nowik et al., Journal of Physics and Chemistry of Solids, 66 (2005) 1307-1313, www.elsevier.com.
Yu. D. Perfil'ev, Mossbauer Spectroscopy of Iron in High Oxidation States, Russian Journal of Inorganic Chemistry, vol. 47, No. 5, 2002, pp. 611-619.
Michael E. Potts, Duane Churchwell, Removal of Radionuclides in wastewaters utilizing potassium ferrate (VI), Water Environmental Research, vol. 6, No. 2, Mar./Apr. 1994.
Thomas D. Waite, Feasibility of Wastewater Treatment with Ferrate, Journal of the Environmental Engineering Division, Dec. 1979.

* cited by examiner

*Primary Examiner* — Stanley Silverman
*Assistant Examiner* — Justin Bova
(74) *Attorney, Agent, or Firm* — Stephen C. Thomas

(57) ABSTRACT

A method for producing a ferrate solution by producing a ferrate intermediate material and then combining the intermediate material with a halogen or ozone solution.

20 Claims, 2 Drawing Sheets

TABLE 1. Iron oxide compounds at different oxidation states of iron.

| Compound | Oxidation | Name | Mineral/Salt |
|---|---|---|---|
| $FeO$ | +2 | Ferrous oxide | Wuestite |
| $Fe_2O_3$ | +3 | Ferric oxide | Hematite |
| $Fe_3O_4$ | +3 | Ferrosoferric oxide | Magnatite |
| $Fe_2O_3 \cdot H_2O$ | +3 | Ferric oxide monohydrate | Geothite |
| $FeOOH$ | +3 | Ferric oxyhydroxide | akaganeite |
| $FeO_2^{2-}$ | +2 | Hypoferrite | $Na_2FeO_2$ |
| $FeO_2^{-}$ | +3 | Ferrite | $NaFeO_2, KFeO_2$ |
| $FeO_3^{2-}$ | +4 | Ferrate(IV) | $Na_2FeO_3$ |
| $FeO_4^{4-}$ | +4 | Ferrate(IV) | $Na_4FeO_4$ |
| $FeO_4^{3-}$ | +5 | Ferrate(V) | $K_3FeO_4$ |
| $FeO_4^{2-}$ | +6 | Ferrate(VI) | $Na_2FeO_4, K_2FeO_4$ |
| $FeO_5^{2-}$ | +7 | Ferrate(VIII) | $Na_2FeO_5$ |

Figure 1.

APPARATUS AND METHOD FOR PRODUCING LIQUID FERRATE

Claimed Benefit of Earlier Filling Date, under 35 U.S.C. 120 Applicant claims the benefit of the earlier filing date in the U.S. Provisional Patent Application Ser. No. 61/246,335, filed Sep. 28, 2009.

FIELD OF INVENTION

This invention is in the field of ferrates and the apparatus, materials, and methods, used to produce ferrate in solution.

BACKGROUND OF INVENTION

The intensive use of chemicals, and complicated production processes, makes the production of ferrates challenging and has kept a widespread application of ferrates limited. Ferrates and the materials and processes, used in the making of ferrates are well known. The ferrate ion $FeO_4^{2-}$ [Oxidation State +6], is well known as the ferrate ion. The ferrate ion, $FeO_4^2$ is known to be a tetrahedral ion that is isostructural with chromate or permanganate. The ferrate ion has been shown to exist as the tetrahedral species $FeO_4^{2-}$. Redox potentials for this ion have been estimated in both acidic and basic media. For example, ferrates, and the processes for producing ferrates are shown and disclosed in U.S. Pat. Nos. 7,476,324; 6,790,429; 4,304,760; 4,405,573.

Iron commonly exist as metallic iron in (Fe(0)), ferrous (Fe(II)), and ferric (Fe(III)) forms in the natural environment. Examples of ferrous and ferric oxides including wuestite, hematite, magnetite, and goethite are shown in (Table 1). Sodium and potassium salts of higher oxidation states of iron ranging from +4 to +8 have also been prepared (See FIG. 1, Table 1).

Salts of ferrate(VI) have been of great interest because of their role as oxidants and hydroxylating agents in industrial and water treatment processes, such as the development of a "super iron" battery, green chemistry synthesis, and non-chlorine oxidation for pollutant remediation.

Ferrate(VI) [oxidation state of iron +6] provides an environmentally benign high energy density cathode for batteries. Selective oxidation by ferrate(VI) can be utilized in synthesizing organic compounds without producing toxic by-products. Ferrate(VI) can complete oxidation reactions in shorter time periods than oxidations carried out by other oxidants such as permanganate and chromate. Iron, unlike chromium and manganese, is considered non-toxic; therefore, ferrate (VI) can make industrial processes more environmentally benign by achieving cleaner technologies for organic syntheses.

Ferrate(VI) is an emerging water-treatment disinfectant and coagulant, which can address the concerns of disinfectant by-products (DBPs) associated with currently used chemicals such as free chlorine, chloramines, and ozone. Like ozone, ferrate(VI) does not react with bromide; so the carcinogenic bromate ion is not produced in the treatment of bromide-containing water. Ferrate(VI) also acts as a strong oxidant to degrade a wide range of compounds present in wastewater and industrial effluents. Importantly, ferrate(VI) has the ability to oxidize emerging contaminants like estrogens, bisphenol-A, and pharmaceuticals present in water.

Ferrate(VI) can achieve disinfection at relatively low dosages over wide ranges of pH. The results suggest irreversible inactivation of *Escherichia coli* (*E. coli*) by ferrate(VI). Treatment of water sources collected worldwide by ferrate(VI) have demonstrated more than 99.9% kill rates of total coliforms. The results have shown that ferrate(VI) can inactivate *E. coli* at lower dosages or shorter contact time than hypochlorite.

Disinfection tests of sodium ferrate(VI) on spore-forming bacteria demonstrated that aerobic spore-formers are reduced up to 3-log units while sulfite-reducing clostridia are effectively killed by ferrate(VI). Both bacteria are resistant to chlorination. Ferrate(VI) can also be effective in treating emerging toxins in the aquatic environment. Ferrate(VI) is also an efficient coagulant.

Examples include removal of metals, nutrients, radionuclides, and humic acids. Ferrate(VI) is advantageous in coagulation where it can be applied in a pre oxidation step of the treatment. Importantly, the multi-functional properties of Ferrate(VI) can thus be utilized in a single dose for recycling and reuse of water and wastewater.

A number of alkali and alkaline earth salts of ferrate(VI) have been synthesized. Three main approaches include: (i) dry thermal synthesis, (ii) electrochemical synthesis, and (iii) wet chemical synthesis. The wet method has been used to prepare sodium and potassium salts of ferrate(VI) ($Na_2FeO_4$ and $K_2FeO_4$). An iron(III) salt was oxidized by alkaline hypochlorite.

$$2FeCl_3 + 3NaOCl + 10NaOH \rightarrow 2Na_2FeO_4 + 9NaCl + 5H_2O$$

The reaction will produce soluble $Na_2FeO_4$, containing high levels of NaOH and unused NaOCl. Thus sodium ferrate (VI) solution produced by above stated method has limited practical applications. The use of sodium hypochlorite in the reaction does not qualify it to be an environmentally-friendly method.

Ozone and OXONE™ (a mixture of $K_2SO_4$, $KHSO_4$, and $KHSO_5$ can be used instead of hypochlorite to synthesize ferrate. However, the intensive use of chemicals in wet chemistry is not recommended for industrial production. In the literature, a solid compound of ferrate(VI) as potassium ferrate(VI) ($K_2FeO_4$) has been produced from soluble $Na_2FeO_4$ by adding potassium hydroxide (KOH). The syntheses of $K_2FeO_4$ using this procedure involved several steps to make the solid product of ferrate(VI) cumbersome with very low economic feasibility.

For electrochemical Ferrate production, iron or iron salts are applied as an anode in an electrochemical cell containing high concentrations of hydroxide ion, typically more than 10 M $OH^-$. The reaction below is shown as one example of synthesizing Ferrate from iron rod.

$$Fe + 8OH \rightarrow FeO_4^2 + 4H_2O + 6e$$

However, there exist drawbacks and disadvantages associated with the electrochemical synthesis of ferrate, including, for example, the formation of a residual passive film on the electrode surface and the extent to which the competitive oxygen evolution reaction (OER) is present, at the ferrate formation potential (to ambient temperature), reduces the efficiency of ferrate synthesis process.

Efficiency for the ferrate(VI) generation is sensitive to electrode pretreatment and to the reaction conditions. For that reason, attention is directed to chemical composition, geometry, mode of activation of the anode, and to the electrolyte composition. The influence of other experimental parameters, for example, temperature, applied current, and electrolysis time, is considered in the process of ferrate production.

As would be well known to those skilled in the art, efficiency in the industrial production of ferrate(VI) is compromised where control over the scope or range of variable parameters, is required. As is well known to those skilled in the art, electrochemical methods produce sodium ferrate(VI), with a high level of hydroxide ion and have limited value for application in treatment of water and wastewater. Furthermore, the use of KOH for the production of paste of $K_2FeO_4$ for applications will also have similar limitations. The separation of solid/dry $K_2FeO_4$ will involve numerous processes; causing economic disadvantages.

In the thermal method of ferrate(VI) production, ferric salt and oxidant are heated to a high temperature. For example, the heating of ferric oxide and potassium nitrate is heated to more than 1000° C., to generate solid potassium ferrate(VI). However, the requirement for a high temperature is a safety and an energy concern. Additionally, solid salts of ferrate(VI) must be protected from ambient humidity, which accelerates decomposition of the ferrate(VI) to Fe(III). Decomposition in ambient environment, can happen in several hours, leading to half-life concentrations.

BRIEF DESCRIPTION OF THE DRAWINGS

FIG. 1 shows in Table I. Iron oxide compounds at different oxidation states of iron.

SUMMARY OF THE INVENTION

Figure 2:
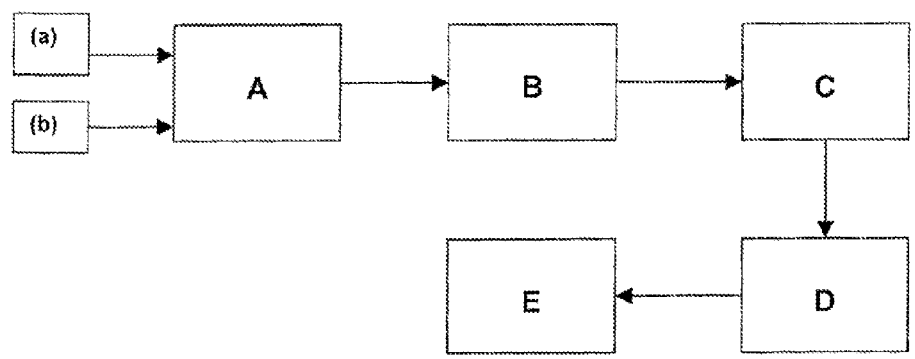
FIG. 2 shows in a block diagram, the system and method for producing and storing liquid Ferrate(VI).

Ferrates, as understood by those skilled in the art, are oxy compounds of iron in various oxidation states, comprising at least one or more of the states II, III, IV, V, or VI. As shown by the disclosed invention and the inventive principles disclosed for a preferred embodiment and in a best mode, a more stable ferrate(VI) may be produced.

In the present invention, a hybrid technology is used to synthesize a ferrate(VI) solution, which does not have inherent difficulties associated with above stated individual methods. This hybrid technology is an environmental friendly approach to synthesize ferrate(VI) solutions. The solution produced in the invention has shown to be relatively stable for several weeks, compared with known ferrate(VI) solutions, which are stable for several hours.

Hybrid, as would be understood by those skilled in the art, and according to the disclosed inventive principles, and as used in describing a preferred embodiment and in a best mode, is a process comprising a heat, or combustion, or electrochemical process, producing a ferrate intermediate material and using the ferrate intermediate material, in an aqueous process with a respective halogen solution or respective ozone solution to produce ferrate(VI).

However, as would be understood by those skilled in the art, a ferrate intermediate material disclosed as iron in oxidation states ≥2, and which is understood to comprise at least one of the following ferrates, $Na_2FeO_3$; $Na_4FeO_4$; $Na_3FeO_4$; $Na_2FeO_4$; $NaFeO_2$; $Na_2FeO_2$, may be produced by any suitable method and the invention is not limited to the methods disclosed herein.

DETAILED DESCRIPTION OF THE INVENTION

Process A.1 & A.2. —Heat and Respective Aqueous Processes
Heat Process

In the inventive process, as shown and disclosed for example, in a best mode and a preferred embodiment, and as represented by FIG. 2, Block A, a mixture of iron(III) oxide and sodium peroxide is heated to approximately 400-650° C., or about approximately 400-650° C., for approximately, or about approximately, 30 minutes. The ensuing reactions produces a ferrate intermediate material, as represented by Block B, wherein iron is understood to exist in oxidation states ≥2, and which is understood to comprise at least one of the following ferrates.
a) $Na_2FeO_3$;
b) $Na_4FeO_4$;
c) $Na_3FeO_4$;
d) $Na_2FeO_4$.
e) $NaFeO_2$;
f) $Na_2FeO_2$.

For example, according to the disclosed principals of the invention, all of the Group 1A metals (alkali metals with a single outer shell valence electron in an s orbit $n(s^1)$ or Group 2A metals (alkaline earth metals with two outer shell valence electrons in an s orbital $n(s^2)$, may be used in place of sodium (Na) as shown for in sodium peroxide, $Na_2O_2$. Symbolically, the first substance may be represent as $X_yO_2$, where $X_y$, represents an element selected from the Group 1A metals or Group 2A earth metals.

According to the disclosed inventive principles, and for example, in a preferred embodiment as shown in a best mode, substance (a), as shown in FIG. 2, Block 1, is disclosed as 1.18 g $Na_2O_2$, sodium peroxide and substance (b) is disclosed as 0.48 g Fe(III) oxide. However, as would be understood by those skilled in the art, other compounds as described, above, may be used, and the example given herein does not limit the invention or the disclosed inventive principles.

The operational ranges of temperatures, and reaction times, according to the disclosed inventive principles and shown for a preferred embodiment and in a best mode, are disclosed for a furnace with ambient atmosphere at sea level, preheated to approximately, or about approximately, 400° C.-650° C., and for approximately, or about approximately, 30 minutes.

The furnace atmosphere may be any inert gas or a mixture of inert gases and oxygen or any atmosphere comprising a mixture of any of the gases as found in an ambient atmosphere at any ambient temperature and pressure.

The ferrate intermediate material is allowed to cool, as disclosed in a preferred embodiment and for a best mode, to room temperature (~20° C.), as represented in block B, as shown in FIG. 1. However, as would be understood by those skilled in the art, the disclosed invention, the ferrate intermediate material as described above and as represented in Block B, may be placed in the aqueous solution, prior to cooling.
Aqueous Process A.1

The ferrate intermediate material, as described herein, as shown for the disclosed inventive principles and for a preferred embodiment in a best mode, is placed in a solution of either (i) sodium hypohalite, (OCl⁻) or in a halogen solution $(X_2)$, as described herein, or (ii) in an ozone solution, as shown in as represented by FIG. 2, Block C.

The result is a ferrate solution, with a purple color. For a preferred embodiment and as shown in a best mode, the solution is filtered with a 0.45 μm micron filter, to produce a stable liquid ferrate, as represented by FIG. 2. Block D and conveniently stored as shown in FIG. 2, Block D. However, as would be understood by those skilled in the art, the filtering process is used to remove remaining solids and the filter size may be varied without departing from the disclosed inventive principles.

For a preferred embodiment and in a best mode the chemical process used to produce the ferrate(VI) solution from the dissolution of a solid material, as shown in FIG. 2, Block C, for example, sodium ferrite, $NaFeO_2$ using in solution, a hypochlorite (OCl⁻), or a halogen, $Cl_2$, Bromine, $Br_2$, or Iodine, $I_2$, represented by the notation $(X_2)$.

The process of the solution of the solid material in hypochlorite Is shown as, $$2NaFeO_2 + 3NaOCl \cdot 2NaOH \rightarrow 2Na_2FeO_4 + 3NaCl + H_2O,$$

where the ferrate intermediate material, for example is $NaFeO_2$

As would be recognized and known to those skilled in the art, the bleach as described above, is commercially available. The reaction of the intermediate product and the bleach solution, as described above, and as represented in block C in FIG. 2 is a solution exhibiting a purple color. For a preferred embodiment, the solution may be diluted five times and then filtered as represented by block D in FIG. 1

Similarly, in place of the bleach solution disclosed as sodium hypochlorite (NaOCl), and as described above, in a preferred embodiment, all of the Group 7A halogens with 7 outer shell valence electrons in configuration $ns^2np^5$. Halogen solutions may be used, represented symbolically by the notation ($X_2$).

The process of placing the ferrate intermediate material in a halogen ($X_2$) solution, as described above may be accomplished, according to the disclosed inventive principles and in a preferred embodiment shown in a best mode, by adding the ferrate intermediate product and the halogen ($X_2$), to an alkaline solution, for example, by passing the halogen ($X_2$) in a gaseous state, through the alkaline solution.

The stoichiometric equations that demonstrate the formation of ferrate(VI) ($FeO_4^{2-}$) from an intermediate ferrate material, according to the disclosed inventive principles, using, for example, hypochlorite (HOCl/OCl—) ion are:

$$FeO_2^{2-} + 2OCl^- \rightarrow FeO_4^{2-} + 2Cl^- \quad \text{Fe(II)}$$

$$FeO_2^- + OCl^- + 2OH^- \rightarrow FeO_4^{2-} + Cl^- + H_2O \quad \text{Fe(III)}$$

$$FeO_4^{4-} + HOCl \rightarrow FeO_4^{2-} + Cl^- + OH^- \quad \text{Fe(IV)}$$

$$2FeO_4^{3-} + HOCl \rightarrow 2FeO_4^{2-} + Cl^- + OH^- \quad \text{Fe(V)}$$

The stoichiometric equations that demonstrate the formation of ferrate(VI) ($FeO_4^{2-}$) from an intermediate ferrate material, according to the disclosed inventive principles, using, for example, $Cl_2$, or $Br_2$ or $I_2$, would be understood by those skilled in the art, from the disclosed inventive principles shown for a preferred embodiment and in a best mode.

Aqueous Process A.2.

Aqueous process A.2. is disclosed as the same process as shown and disclosed for process A.I except a solution of ozone is used in place of the disclosed hypochlorite (OCl—), or halogen ($X_2$), solution.

A shown and described according to the disclosed inventive principles and in a preferred embodiment and in a best mode, for Process A.2. the ferrate intermediate material, as represented by Block B in FIG. 2, is placed in an ozone solution as represented by Block C, in FIG. 2, which produces a ferrate (VI) solution chemically described as, $$2NaFeO_2 + 4O_3 + 2NaOH \rightarrow 2Na_2FeO_4 + 9/2O_2 + H_2O$$

The stoichiometric equations that demonstrate the formation of ferrate(VI) ($FeO_4^{2-}$) from an intermediate ferrate material using, for example, Ozone ($O_3$) are:

$$FeO_2^{2-} + 2O_3 \rightarrow FeO_4^{2-} + 2O_2 \quad \text{Fe(II)}$$

$$2FeO_2^- + 4O_3 + 2OH^- \rightarrow FeO_4^{2-} + 9/2O_2 + H_2O \quad \text{Fe(III)}$$

$$FeO_4^{4-} + O_3 + H_2O \rightarrow FeO_4^{2-} + O_2 + 2OH^- \quad \text{Fe(IV)}$$

$$2FeO_4^{3-} + O_3 + H_2O \rightarrow 2FeO_4^{2-} + O_2 + 2OH^- \quad \text{Fe(V)}$$

The production of an ozone solution would be well known to those skilled in the art.

The process of placing the ferrate intermediate material in an ozone ($O_3$) solution, as described above may be accomplished, according to the disclosed inventive principles and in a preferred embodiment shown in a best mode, by adding the ferrate intermediate product and the ozone ($O_3$) to an alkaline solution, for example, by passing the ozone ($O_3$) in a gaseous state, through the alkaline solution.

Process B.1 & B.2 Electrochemical and Respective Aqueous Processes

Electrochemical Process

As would be known to those skilled in the art, an intermediate ferrate material may be produced by use of an electrochemical procedure, as shown for the oxidation of iron metal $$Fe + 2OH^- \rightarrow Fe(OH)_2 + 2e^-$$

$$Fe(OH)_2 \rightarrow OH^- \rightarrow FeOOH + H_2O + e^-$$

$$FeOOH + OH^- \rightarrow FeO_2^- \rightarrow H_2O$$

The connection of the iron (Fe) is to the anode in a conductive solution, for example as would be known to those skilled in the art, a solution of sodium hydroxide. However, as would be understood by those skilled in the art, the invention and the inventive principles are not limited to a hydroxide solution.

As shown in a preferred embodiment and in a best mode, as would be understood by those skilled in the art, in place of the iron metal Fe(0), ferrous (Fe(II)), and ferric (Fe(III)) compound, or a higher oxidation state (Fe(IV) and Fe(V)), may be used.

Electrolyte composition: sodium hydroxide: 10-16 M; potassium hydroxide: 10-16 M; Mixture of NaOH and KOH; Total ionic strength-10-16 M (e.g. For 14 M total ionic strength 7.5 M NaOH and 7.5 M KOH or 3 M NaOH and 11 M KOH or 11 M NaOH and 3 M KOH).

As disclosed and shown according to the inventive principles and for a preferred embodiment and in a best mode, a suitable temperature range is 15-60° C. An iron rod Fe(0) anode may contain silica, carbon, and may be steel.

For an anode comprising, for example, inert electrode; salts of Fe(II) and Fe(III) [ferrous chloride, ferric chloride, ferrous sulfate, ferric sulfate], and the anode may be a boron doped diamond anode with and without ultrasound, porous platinum.

Aqueous Process B.1.

The ferrate intermediate material as disclosed herein by the electrochemical process, according to the disclosed inventive principles, undergoes an aqueous step, as described above for the Process A.1, by placing the solution containing the ferrate intermediate material in a halogen solution, and a ferrate(VI) is produced according to the disclosed inventive principles, described, for example as, $$2NaFeO_2 + 3NaOCl + 2NaOH \rightarrow 2Na_2FeO_4 - 3NaCl + H_2O$$

Aqueous Process B.2.

The ferrate intermediate material, produced as disclosed herein by the electrochemical process, placed in an ozone solution undergoes an aqueous step, as describe above for aqueous process A.2, and a ferrate(VI) is produced according to the disclosed inventive principles described, for example as, $$2NaFeO_2 + 4O_3 + 2NaOH \rightarrow 2Na_2FeO_4 + 9/2O_2 + H_2O$$

Process C1. & C2. Combustion Process and Respective Aqueous Processes

Combustion Process

As shown according to the disclosed inventive principles, and in a preferred embodiment, the ferrate intermediate material can also be produced by a combustion method, which has several advantages such as (i) no milling of starting material is required, (ii) products are formed at lower temperature in a short time, (iii) a stoichiometric amount of the ferrite ion is produced, and (iv) small size with large surface area of ferrite is obtained.

As would be understood by those skilled in the art, by combustion is meant a process by which carbon dioxide is produced.

As shown and disclosed according to the disclosed inventive principles, sodium ferrite can be produced by combustion of an aqueous solutions of sodium nitrate, ferric nitrate and ethylene glycol. The stoichiometric equation as an example to produce sodium ferrite by heating aqueous solutions of sodium nitrate, ferric nitrate and ethylene glycol at 400° C. can be written as, $$NaNO_3 + Fe(NO_3)_3 + 2C_2H_6O_2 \rightarrow NaFeO_2 - 4CO_2 + 2N_2 + 6H_2O$$

A fusion of sodium carbonate and ferric oxide according to following equation can also produce the ferrite ion.

$$Na_2CO_3 Fe_2O_3 - 2NaFeO_2 + CO_2$$

As shown for the disclosed inventive principles, shown and disclosed in a preferred embodiment, iron in oxidation state ≥2 is produced by the reaction of a powdered mixture of two (2) substances (a) and (b) in reactor A, as shown in FIG. 1.

As shown and disclosed according to the inventive principles and for a preferred embodiment and in a best mode, the temperate range for the combustion process may be approximately or approximately about 350-500° C.

Aqueous Process C.1.

The ferrate intermediate material disclosed herein by the combustion process, according to the disclosed inventive principles, undergoes an aqueous step, as described above for the Process A.1. by placing the intermediate material in a halogen solution, and to produce ferrate(VI), according to the disclosed inventive principles as described above for A1.

Aqueous Process C.2.

By placing the solution containing the ferrate intermediate material, produced as disclosed herein by the combustion process, in an ozone solution, as describe above for aqueous process A.2, to produce ferrate(VI) according to the disclosed inventive principles as described above for A2.

As would be understood by those skilled in the art, the time or temperature ranges or the stated amounts used in the disclosed inventive method, are as disclosed for a preferred embodiment in a best mode of using the invention and are not restrictive or limiting of the operation of the inventive method or its principles. As would be known and apparent to those skilled in the art, the inventive method may be operated outside the disclosed preferred embodiment and best mode, temperature or time ranges or stated amounts, and according to the disclosed inventive principles, to produce the stable ferrate solution, while not departing from the disclosed inventive principles.

For example, by "approximately," or "approximately about," as used herein is understood to mean times and temperatures, for the method of operating the invention, to produce the ferrate solution, as by operation within the time or temperature capabilities of laboratory equipment, as may be used in, or found in, a college laboratory, such as at the Florida Institute of Technology, or as may be varied, extending the disclosed time or temperature ranges outside the disclosed preferred embodiment and best mode, according to the disclosed inventive principles, to produce the disclosed stable ferrate solution, while not departing from the disclosed inventive principles.

The invention claimed is:

1. A process for producing a stable ferrate (VI) solution, consisting of,
   the step of producing a solid ferrate intermediate material by heating a mixture of an iron(III) oxide and sodium peroxide;
   the step of placing said solid ferrate intermediate material in a hypochlorite (OCl—), $Cl_2$, $Br_2$, $I_2$, or ozone, solution;
   the step of dissolution of said solid ferrate intermediate material; and
   the step of producing a stable ferrate(VI) solution.

2. The process of claim 1, wherein said step of placing consists of the step of placing said solid ferrate intermediate material in a hypochlorite (OCl—) solution; and
   said step of producing a stable ferrate(VI) solution consists of the process, $$2NaFeO_2 + 3NaOCl + 2NaOH \rightarrow 2Na_2FeO_4 + 3NaCl + H_2O—.$$

3. The process of claim 2 wherein said step of producing a stable ferrate(VI) solution consists of the step of producing a ferrate(VI) solution having greater than half-life concentration after two weeks.

4. The process of claim 1 wherein said step of producing a stable ferrate(VI) solution consists of the step of producing a ferrate(VI) solution having greater than half-life concentration after two weeks.

5. The process of claim 1, wherein said step of placing consists of the step of placing said solid ferrate intermediate material in a hypochlorite (OCl⁻) solution and said step of producing a stable ferrate (VI) ($FeO_4^{2-}$) solution consists of one or more of the processes, any or all of which may run simultaneously, selected from the group consisting of $$FeO_2^{2-} + 2OCl^- \rightarrow FeO_4^{2-} + 2Cl^-, \qquad\qquad Fe(II)$$

$$FeO_2^- + OCl^- + 2OH^- \rightarrow FeO_4^{2-} + Cl^- + H_2O, \qquad Fe(III)$$

$$FeO_4^{4-} + HOCl \rightarrow FeO_4^{2-} + Cl^- + OH^-, \qquad\qquad Fe(IV)$$

and $$2FeO_4^{3-} + HOCl \rightarrow 2FeO_4^{2-} + Cl^- + OH^- \qquad\qquad Fe(V).$$

6. The process of claim 5, wherein said step of producing a stable ferrate(VI) solution consists of the step of producing a ferrate(VI) ($FeO_4^{2-}$) solution having greater than half-life concentration after two weeks.

7. The process of claim 1, wherein said step of placing consists of the step of placing said solid ferrate intermediate material in an ozone solution;
   and said step of producing a stable ferrate(VI) solution consists of the process, $$2NaFeO_2 + 4O_3 + 2NaOH \rightarrow 2Na_2FeO_4 + 9/2O_2 + H_2O.$$

8. The process of claim 1 consisting of the step of placing said solid ferrate intermediate material in an ozone solution and said step of producing a stable ferrate(VI) ($FeO_4^{2-}$) solution consists of one or more of the processes, any or all of which may run simultaneously, selected from the group consisting of $$FeO_2^{2-} + 2O_3 \rightarrow FeO_4^{2-} + 2O_2, \qquad Fe(II)$$

$$2FeO_2^- + 4O_3 + 2OH^- \rightarrow 2FeO_4^{2-} + 9/2O_2 + H_2O, \qquad Fe(III)$$

$$FeO_4^{4-} + O_3 + H_2O \rightarrow FeO_4^{2-} + O_2 + 2OH^-, \qquad Fe(IV)$$

and $$2FeO_4^{3-} + O_3 + H_2O \rightarrow 2FeO_4^{2-} + O_2 + 2OH^-. \qquad Fe(V).$$

9. The process of claim 8 wherein said step of said producing said stable liquid ferrate(VI) ($FeO_4^{2-}$) solution consists of the step of producing a ferrate(VI) ($FeO_4^{2-}$) solution having greater than half-life concentration after two weeks.

10. A process for producing a stable liquid ferrate(VI), hypochlorite (OCl—), $Cl_2$, $Br_2$, $I_2$, or ozone, solution, consisting of:
the step of producing a solid ferrate intermediate material by heating a mixture of iron(III) oxide and a peroxide represented by the notation $X_yO_2$, wherein $X_y$ represents one of the Group 1A metals or one of the Group 2A metals;
the step of placing said solid ferrate intermediate material in a hypochlorite (OCl—), or $Cl_2$, or $Br_2$, or $I_2$, or ozone, solution;
the step of dissolution of said solid ferrate intermediate material in said solution; and
the step of producing a stable ferrate(VI) solution.

11. The process of claim 10, wherein said step of producing a solid ferrate intermediate material, consists of the step of selecting a said Group 1A metal from the group consisting of sodium and potassium or selecting a said Group 2A metal from the group consisting of magnesium, calcium, and barium.

12. The process of claim 10, wherein said step of placing consists of the step of placing said solid ferrate intermediate material in a hypochlorite (OCl—) solution; and
said step of producing a stable ferrate(VI) solution consists of the process, $$2NaFeO_2 + 3NaOCl + 2NaOH \rightarrow 2Na_2FeO_4 + 3NaCl + H_2O.$$

13. The process of claim 10, wherein said step of said producing said stable liquid ferrate(VI) solution consists of the step of producing a ferrate(VI) solution having greater than half-life concentration after two weeks.

14. The process of claim 10, wherein said step of placing consists of the step of placing said ferrate intermediate material in a hypochlorite (OCl$^-$) solution and said step of producing a stable ferrate(VI) ($FeO_4^{2-}$) solution consists of one or more of the processes, any or all of which may run simultaneously, selected from the group consisting of $$FeO_2^{2-} + 2OCl^- \rightarrow FeO_4^{2-} + 2Cl^-, \qquad Fe(II)$$

$$FeO_2^- + OCl^- + 2OH^- \rightarrow FeO_4^{2-} + Cl^- + H_2O, \qquad Fe(III)$$

$$FeO_4^{4-} + HOCl \rightarrow FeO_4^{2-} + Cl^- + OH^-, \qquad Fe(IV)$$

and $$2FeO_4^{3-} + HOCl \rightarrow 2FeO_4^{2-} + Cl^- + OH^-, \qquad Fe(V).$$

15. The process of claim 14, wherein said step of producing said stable ferrate(VI) solution consists of the step of producing a ferrate(VI) ($FeO_4^{2-}$) solution having greater than half-life concentration after two weeks.

16. The process of claim 10, and wherein said step of placing consists of the step of placing said solid ferrate intermediate material in an ozone solution; and said step of producing a stable ferrate(VI) solution consists of the process, $$2NaFeO_2 + 4O_3 + 2NaOH \rightarrow 2Na_2FeO_4 + 9/2O_2 + H_2O.$$

17. The process of claim 10, wherein said step of placing consists of the step of placing said solid ferrate intermediate material in an ozone solution; and said step of producing a stable ferrate(VI) solution consists of one or more of the processes, any or all of which may run simultaneously, selected from the group consisting of $$FeO_2^{2-} + 2O_3 \rightarrow FeO_4^{2-} + 2O_2, \qquad Fe(II)$$

$$2FeO_2^- + 4O_3 + 2OH^- \rightarrow 2FeO_4^{2-} + 9/2O_2 + H_2O, \qquad Fe(III)$$

$$FeO_4^{4-} + O_3 + H_2O \rightarrow FeO_4^{2-} + O_2 + 2OH^-, \qquad Fe(IV)$$

and $$2FeO_4^{3-} + O_3 + H_2O \rightarrow 2FeO_4^{2-} + O_2 + 2OH^-. \qquad Fe(V).$$

18. The process of claim 16, wherein said step of producing a stable ferrate(VI) solution consists of the step of producing a ferrate(VI) ($FeO_4^{2-}$) solution having greater than half-life concentration after two weeks.

19. The process of claim 17, wherein said step of producing said stable liquid ferrate(VI) solution consists of producing a ferrate(VI) ($FeO_4^{2-}$) solution having greater than half-life concentration after two weeks.

20. The process of claim 12, wherein said step of said producing said stable liquid ferrate(VI) solution consists of the step of producing a ferrate(VI) solution having greater than half-life concentration after two weeks.

* * * * *